United States Patent [19]

Woestman

[11] 4,445,526
[45] May 1, 1984

[54] SYSTEM AND METHOD FOR CONTROLLING THE SPECIFIC GRAVITY AND VISCOSITY OF THE SLURRY APPLIED TO TELEVISION PICTURE TUBE FACEPLATES

[75] Inventor: John W. Woestman, Lancaster, Pa.

[73] Assignee: RCA Corporation, New York, N.Y.

[21] Appl. No.: 307,295

[22] Filed: Sep. 30, 1981

[51] Int. Cl.³ .................. G05D 11/06; G06F 15/46
[52] U.S. Cl. ................................. 137/3; 137/91; 137/92; 364/500; 427/68
[58] Field of Search ............... 137/3, 4, 91, 92; 118/688, 689, 690, 712; 427/8, 58, 157; 364/469, 500, 502

[56] References Cited

U.S. PATENT DOCUMENTS

| | | | |
|---|---|---|---|
| 2,979,066 | 4/1961 | Christie | 137/3 |
| 3,004,544 | 10/1961 | Guptill, Jr. | 137/1 |
| 3,008,809 | 11/1961 | Martinez | 23/285 |
| 3,229,077 | 1/1966 | Gross | 235/151.34 |
| 3,313,643 | 4/1967 | Branin | 427/68 |
| 3,385,680 | 5/1968 | Feld et al. | 137/3 |
| 3,475,392 | 10/1969 | McCoy et al. | 137/4 |
| 3,572,361 | 3/1971 | Terhar et al. | 137/92 |
| 3,677,406 | 7/1972 | King et al. | 210/75 |
| 3,680,070 | 7/1972 | Nystuen | 340/244 |
| 3,762,429 | 10/1973 | Fitzgerald et al. | 137/92 |
| 3,831,616 | 8/1974 | Weyers | 137/92 |
| 3,907,388 | 9/1975 | Stanton et al. | 137/3 |
| 3,930,462 | 1/1976 | Day | 118/5 |
| 4,106,098 | 8/1978 | Moody, Jr. et al. | 364/500 |
| 4,151,744 | 5/1979 | Hemmings | 75/54 |

Primary Examiner—Martin P. Schwadron
Assistant Examiner—James R. Shay
Attorney, Agent, or Firm—Eugene M. Whitacre; Dennis H. Irlbeck; Lester L. Hallacher

[57] ABSTRACT

A system and method for continuously maintaining the specific gravity and viscosity of the slurry applied to a television picture tube includes a container for dispensing slurry to the faceplate of such a tube and for receiving excess slurry from the faceplate. The level of slurry in the container is held constant by the addition of materials to the container. The first added material has a specific gravity greater than that of the material dispensed to the faceplate. The second material has a viscosity which is greater than that of the material dispensed to the faceplate. The quantity of the third material is determined by the specific gravity and viscosity corrections required to bring the parameters of the slurry in the first container to the preselected values. By adding the three materials to the dispenser in accordance with error signals representative of the three parameters, the specific gravity, viscosity and level are continuously held within specified limits.

12 Claims, 7 Drawing Figures

SYSTEM AND METHOD FOR CONTROLLING THE SPECIFIC GRAVITY AND VISCOSITY OF THE SLURRY APPLIED TO TELEVISION PICTURE TUBE FACEPLATES

BACKGROUND OF THE INVENTION

This invention relates generally to the manufacture of television picture tubes and particularly to a system and method for continuously controlling the specific gravity and viscosity of the phosphor slurry applied to the faceplates of such tubes.

During the production of television picture tubes, a phosphor slurry is added to the inside of the faceplate panel. The slurry consists of phosphor crystals suspended in a solution of polyvinyl alcohol (PVA), water and other stabilizing and wetting agents. In order to insure that the entire faceplate is coated with the slurry, excess slurry is applied to the faceplate. The faceplate is rotated while the slurry is dispensed and after the entire faceplate surface is coated, the excess slurry is deposited in a salvage tank and returned to the source from which the slurry was originally dispensed. The specific gravity and viscosity of the salvaged slurry are substantially lower than those of the original supply because phosphor crystals adhere to the faceplate.

Consistency of tube quality requires that the specific gravity and viscosity of the slurry dispensed to every faceplate be within specified limits, and preferably should remain substantially constant. In the prior art, efforts are made to maintain these parameters within the required specifications by replenishing the contents of the dispensing vessel from a nearby filler vessel. The specific gravity and viscosity of the slurry in the filler vessel are above those required for dispensation upon the faceplate and accordingly, when combined with the salvage, the slurry composition hopefully remains within an acceptable range of limits. However, because the parameters are not continuously monitored and properly controlled, substantial variations in the specific gravity and viscosity of the slurry frequently occur.

The instant invention overcomes this difficulty by the provision of a system for controlling the specific gravity and viscosity of the phosphor slurry on a continuous basis.

SUMMARY OF THE INVENTION

A system for controlling the viscosity and specific gravity of a slurry applied to the faceplate of a television picture tube includes a first container which stores and dispenses the slurry to the faceplate, and also receives excess slurry from the faceplate. Three additional containers dispense three different materials to the first container. A level sensor senses the level of slurry in the first container and provides a slurry level signal. A specific gravity sensor senses the specific gravity of the slurry in the first container and provides a specific gravity signal. A viscosity sensor senses the specific gravity of the slurry in the first container and provides a viscosity signal. First and second means respectively provide a specific gravity reference signal and a viscosity reference signal. A data process control receives the slurry level signal, the specific gravity signal, the viscosity signal, the specific gravity reference signal and the viscosity reference signal to control the level, specific gravity and viscosity of the slurry in the first container.

DETAILED DESCRIPTION OF THE PREFERRED EMBODIMENT

Figure 1:
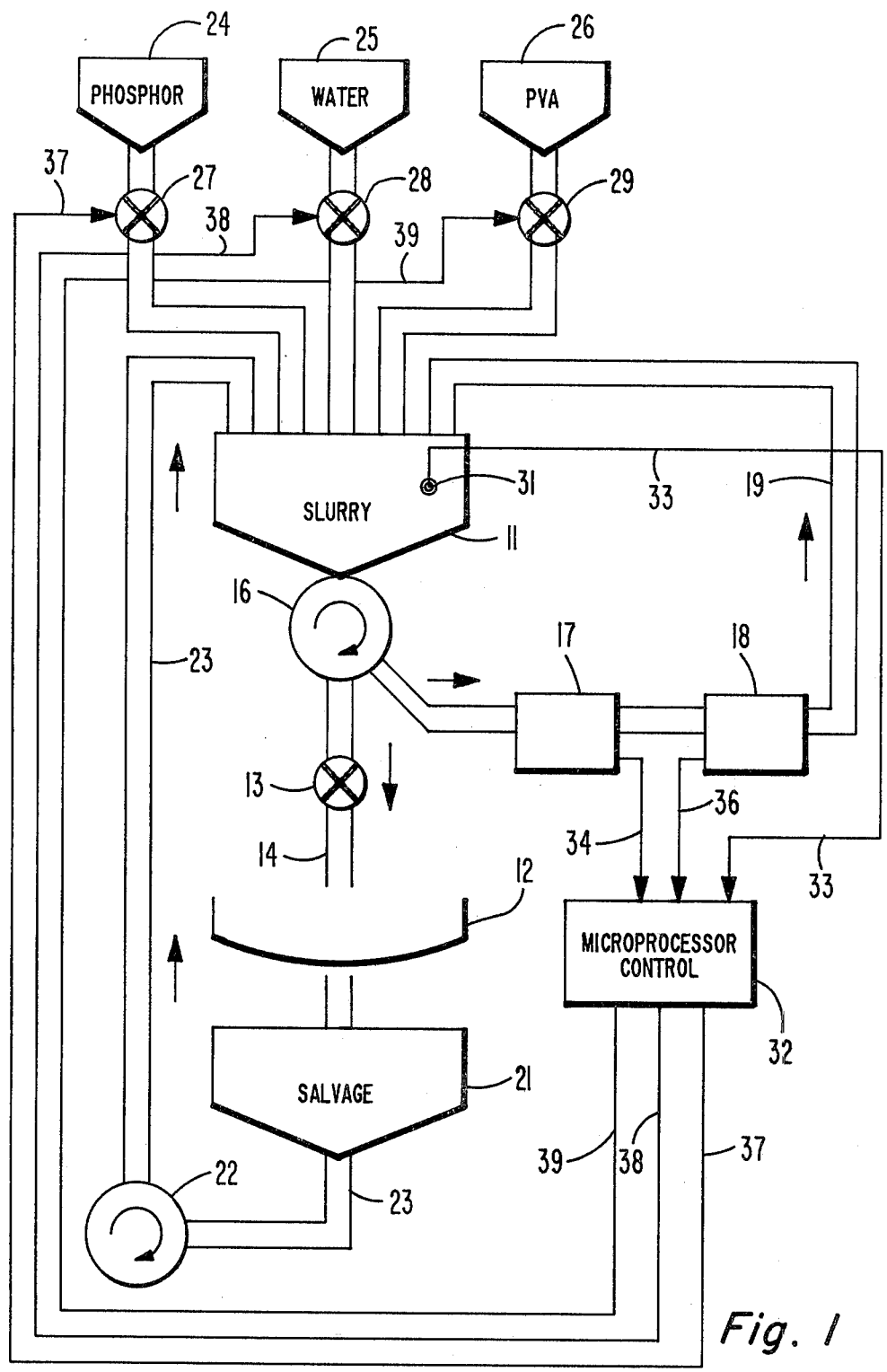
FIG. 1 is a preferred embodiment of the system for controlling the specific gravity and viscosity of the slurry applied to the faceplate of a television picture tube.

In FIG. 1, a dispensing container 11 is filled with phosphor slurry to a predetermined level. The slurry is dispensed to the inside of a television tube faceplate 12 through a dispense valve 13 and appropriate plumbing 14. The slurry passes through a circulator pump 16 so that a slurry sample is provided to a specific gravity sensor 17 and a viscosity sensor 18 and returned to the container 11 by way of appropriate plumbing 19.

The volume of slurry dispensed to the faceplate 12 is dependent upon the faceplate size and an excess is used in order to insure that the entire inside surface of the faceplate is coated with the slurry. The excess slurry is poured from the faceplate 12 into a salvage container 21 and a salvage pump 22 returns the excess slurry to the container 11 by way of appropriate plumbing 23.

During the disposition of the slurry onto the faceplate 12, a substantial number of the phosphor crystals which are suspended in the slurry adhere to the faceplate 12. For this reason, the specific gravity and viscosity of the salvaged slurry are substantially different from the preselected optimum values of the slurry originally dispensed from the container 11. Accordingly, the salvage slurry lowers the specific gravity and viscosity of the slurry in the container 11. Uniform and optimum product quality requires that the slurry dispensed onto all of the screens 12 has essentially the same specific gravity and viscosity. The specific gravity and viscosity of the slurry contained within the tank 11 are held within very close limits to the preselected optimum values by the provision of three additional containers 24, 25, and 26 which respectively contain phosphor, water and polyvinyl alcohol. The phosphor within the container 24 has a specific gravity which is greater than the optimum specific gravity of the slurry within the container 11. The viscosity of the polyvinal alcohol in the container 26 is greater than that of the slurry within the container 11. The water is added to bring the volume of added material up to the amount needed to maintain a constant level in the container 11. The phosphor, water and PVA are dispensed to the container 11 through control valves 27, 28 and 29 respectively. A level sensor 31 is provided within the container 11 to provide an output signal which is representative of the level of slurry within the container 11.

In operation, slurry is dispensed to a faceplate and the level within the container 11 drops. Salvage slurry is returned from the salvage container 21 and the slurry level of the container 11 raises slightly. The level sensor 31 provides a level signal to a data processor 32 over a line 33 and the volume of material which must be added to the container 11 to return the level to that desired is known. A sample of the slurry is pumped by the circulator pump 16 to the specific gravity sensor 17 and the viscosity sensor 18 which respectively provide specific gravity and viscosity signals on lines 34 and 36 respectively to the data processor 32. The processor 32 computes the amounts of phosphor, water and PVA which must be added to the slurry within the container 11 in order to return the slurry level, specific gravity and viscosity to the preestablished values. The signals resulting from these computations are provided to the control valves 27, 28 and 29 over the leads 37, 38 and 39 respectively. The slurry in the container 11 is continually stirred and accordingly, the additional materials from the containers 24, 25 and 26 are thoroughly mixed with the slurry prior to the dispensing of slurry to the next faceplate 12.

The data process control 32 can be a read only memory (ROM), a random access memory (RAM), an erasable read only memory (EPROM), hardwired discrete components, or any other type of digital processor. An Intel iSBC80/20-4 microprocessor has been found to be effective for use as the data processor 32.

Figure 2:
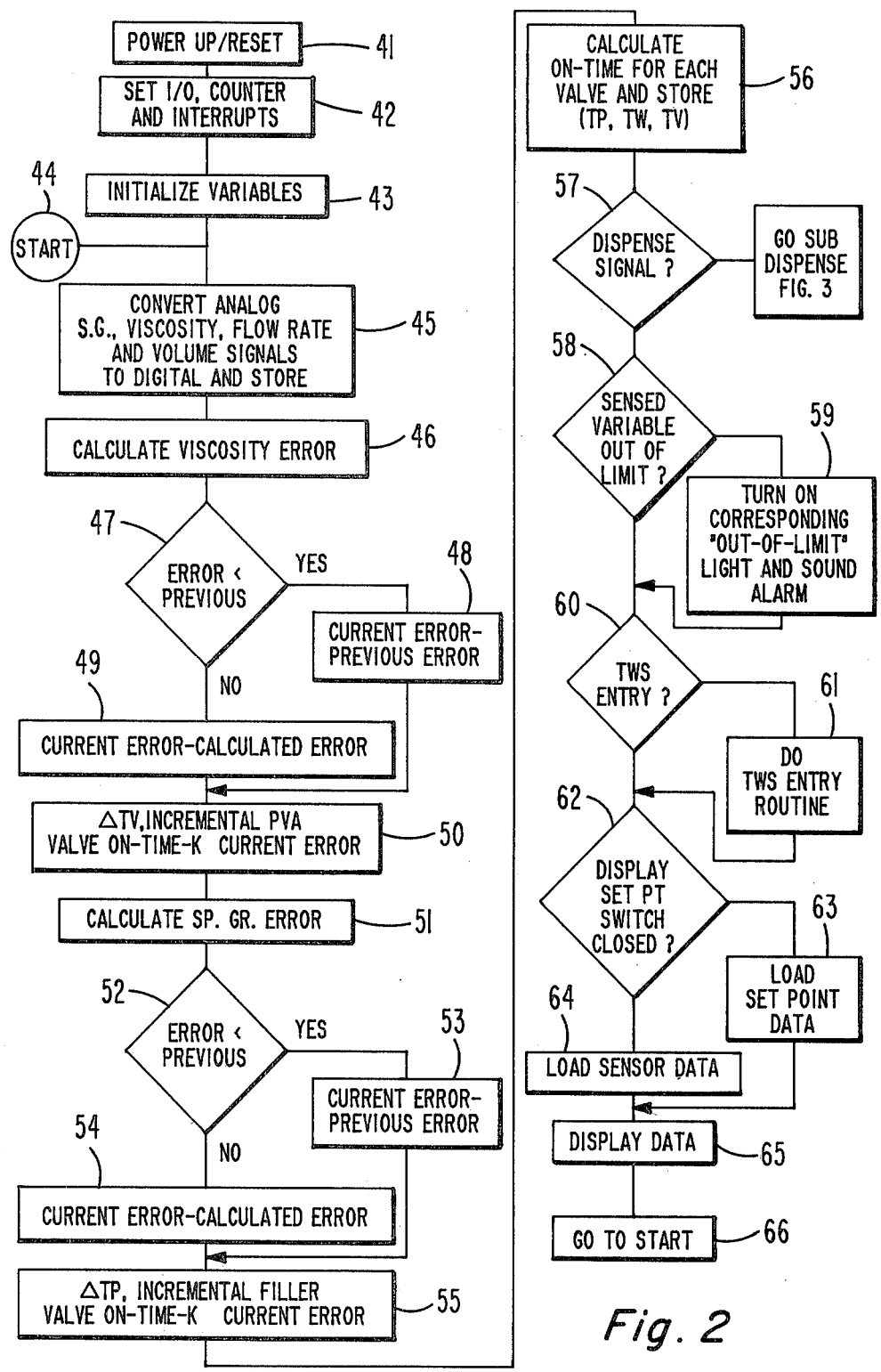
FIG. 2 is a flow chart of a preferred embodiment of a data processor used to control the system of FIG. 1.

FIG. 2 is a flow chart of the control functions of the data process control 32. At control function 41, the power is turned on and all control functions are reset. At control function 42 the input/output terminals, counter settings and interrupts are set into the process control. At control function 43, the preselected values for the parameters specific gravity, viscosity and slurry level in container 11 are set into the control. The control 32 is arranged in a cabinet (not shown) and the control functions provided at 41, 42, and 43 can be set into the control with use of thumbwheel switches or other mechanisms in known manner. After setting the initial values, the control process is commenced at start point 44 and at control function 45 the specific gravity, viscosity and volume level signals are converted from analog to digital form. At control function 46, the viscosity signal provided by the viscosity sensor 38 is compared with the predetermined viscosity level which was set into the control 32 to provide an error signal which is representative of the change in viscosity required to bring the slurry in container 11 to the predetermined value. At control function 47, the error signal is compared to the previous error signal and if it is less than the previous signal, control function 48 is entered so that the current error is subtracted from the previous error. When the error is not less than the previous error, control function 49 is entered so that the current error is decreased by a calculated error. The error signal is selected in this manner because the amount of slurry dispensed to the faceplate 12 is known. The desired viscosity of the slurry in container 11 and the viscosity of the PVA in container 26 also are known. Accordingly, a calculated, or expected, error is known. The sensed error therefore is measured with respect to the calculated, or expected, parameter change rather than the actual change. This substantially decreases hunting of the system which could occur if large error signals were used. This is fully described hereinafter with respect to FIGS. 4a to 4d. Control function 50 is then entered and the change in the dispense time ($\Delta TV$) for the viscosity affecting material (PVA) is calculated. This calculation determines the change in time from the preselected time that the valve 29 will be opened to dispense the PVA from container 26 into the slurry container 11.

After the change in opening time for the valve 29 is calculated, control function 51 is entered and a specific gravity error signal is generated to determine the amount of phosphor from the container 24 which must be added to the slurry within the container 11 to bring the specific gravity up to the preselected value. This error signal is processed at control functions 52 through 54 in the same manner as the viscosity error. Control function 55 is then entered and the change in the specific gravity dispense time ($\Delta TP$) of phosphor is calculated to determine the change in the open time of the valve 27 in the same manner as the open time for the valve 29 is calculated.

The changes in the dispense time calculations from the control functions 50 and 55 are entered into at control function 56 where the total open times TP, TW and TV for the three valves 27, 28 and 29 respectively are calculated. The changes in dispense times for the specific gravity material and the viscosity material determined at control functions 55 and 56 are added to preselected open times to establish the total open times TP and TV. The water dispense time TW is adjusted to insure that the total volume of material added from the three containers 24, 25 and 26 is very close to the quantity required to raise the level of slurry in the container 11 to the desired level, while simultaneously insuring that sufficient quantities of phosphor and PVA to reach the desired values of specific gravity and viscosity are added. The manner in which these calculations are made is described in detail hereinafter with respect to FIGS. 4a to 4d.

Figure 3:
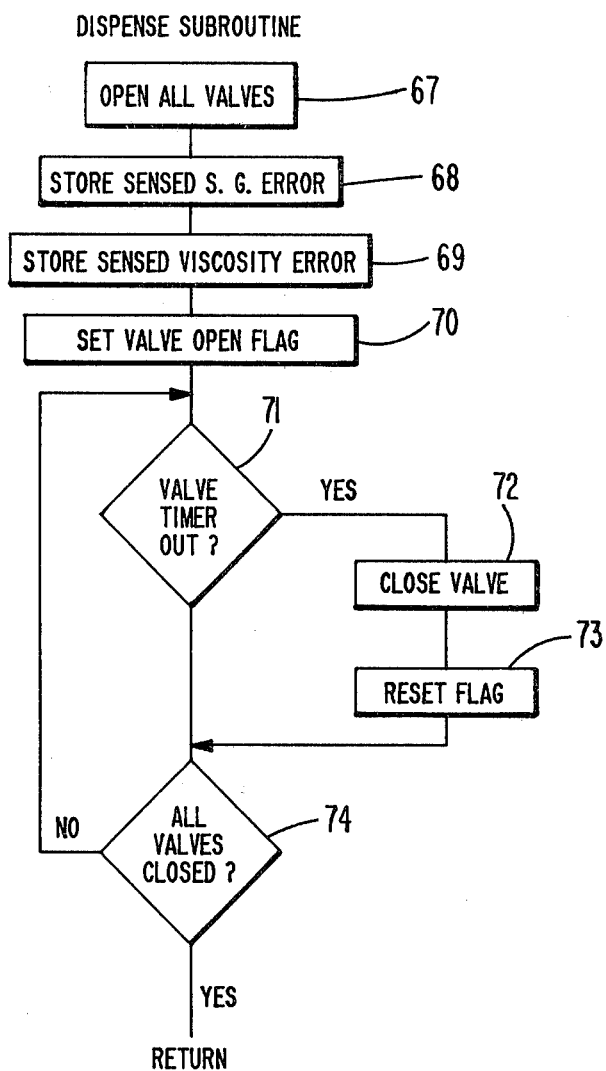
FIG. 3 is a flow chart of the dispense routine for dispensing slurry to the faceplate of FIG. 1.
Figure 4A:
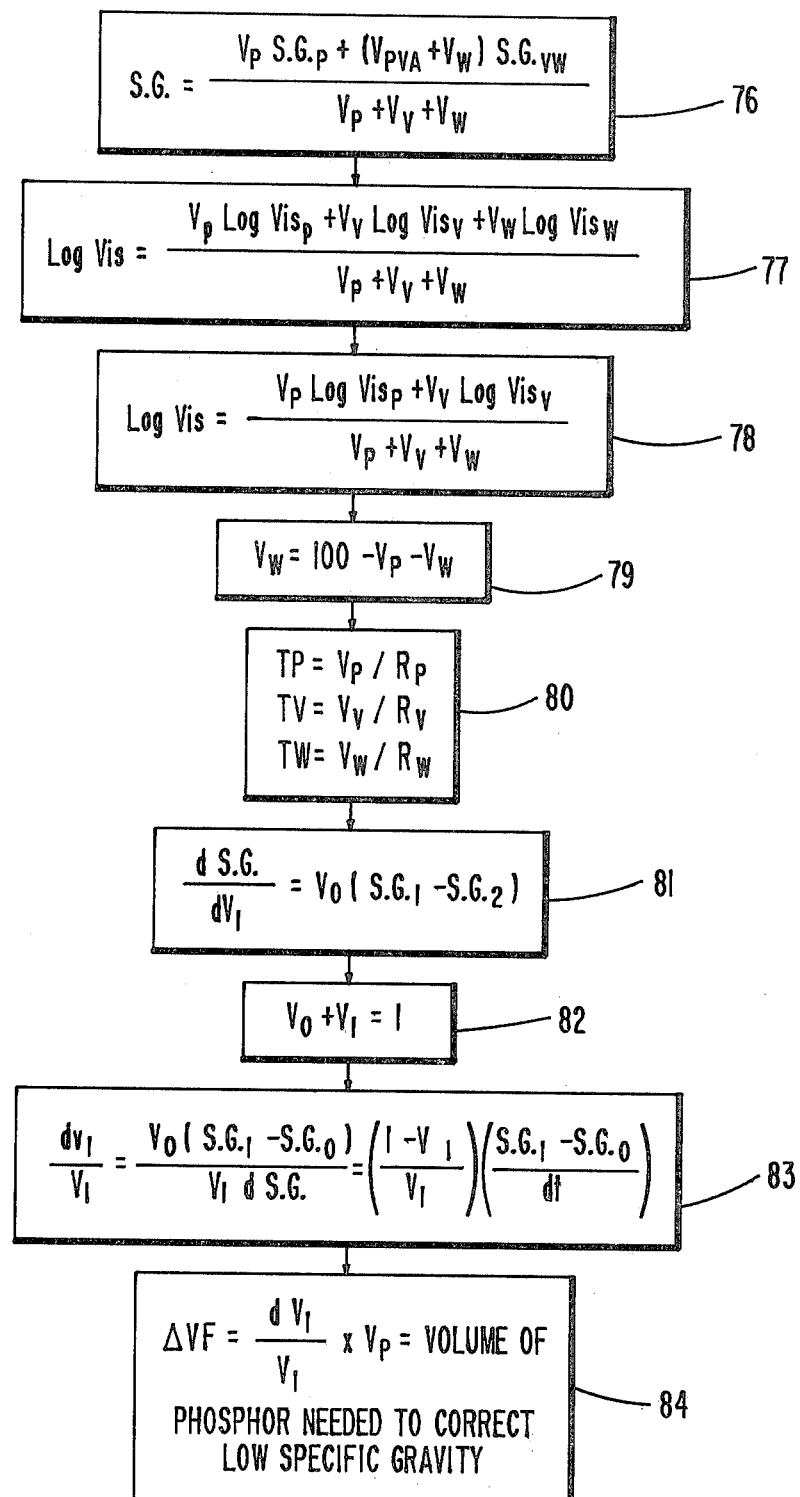
FIGS. 4a to 4d are a flow chart of the changing of the open time of the control valves and the generation of error signals.
Figure 4B:
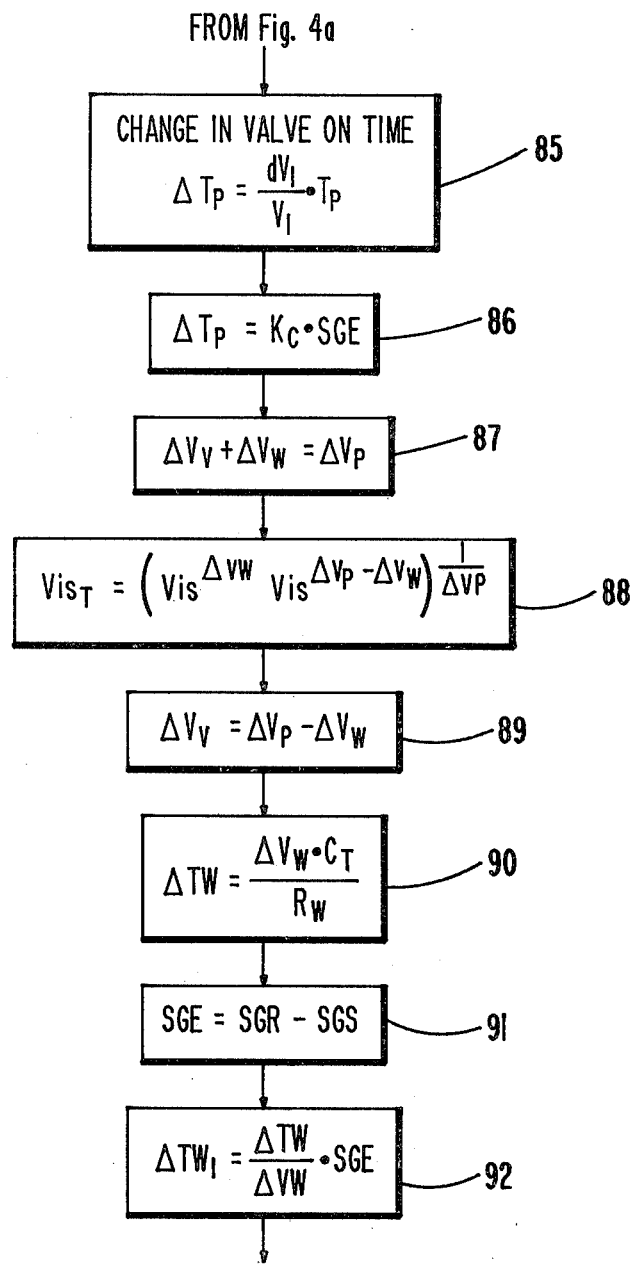
Figure 4C:
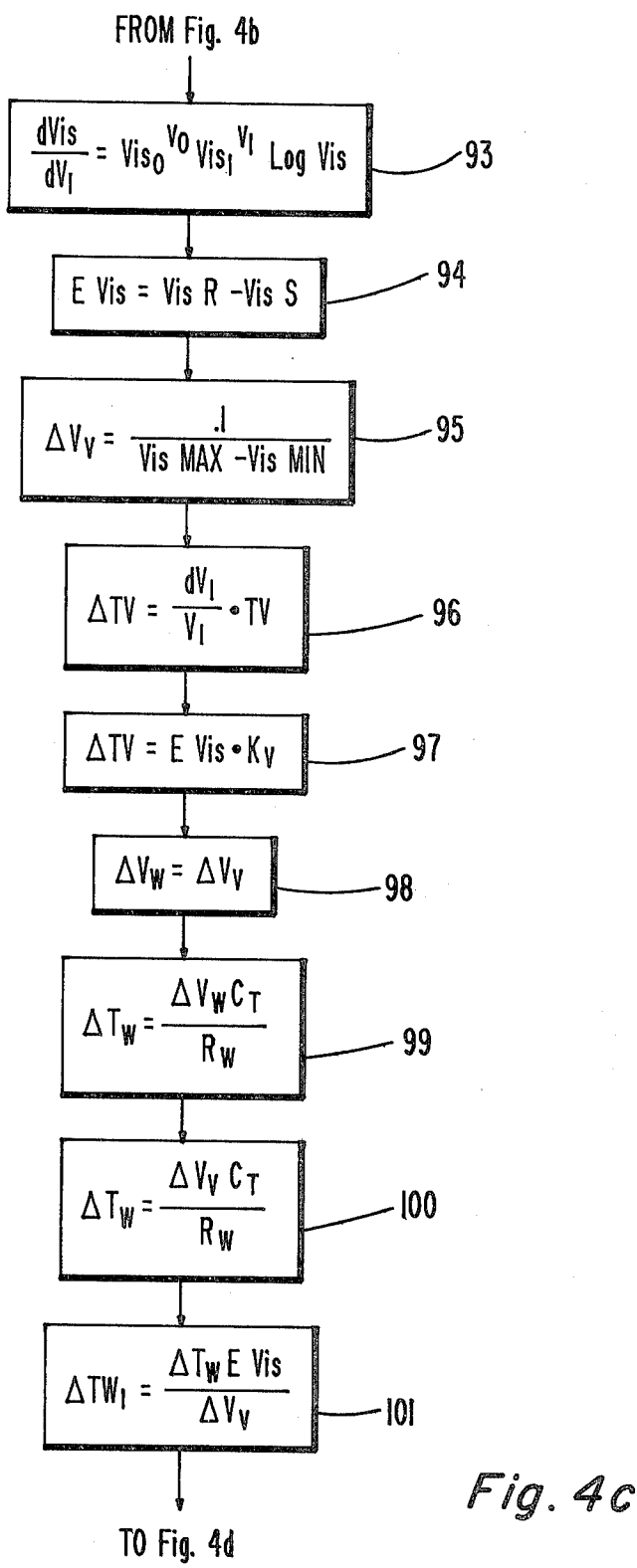
Figure 4D:
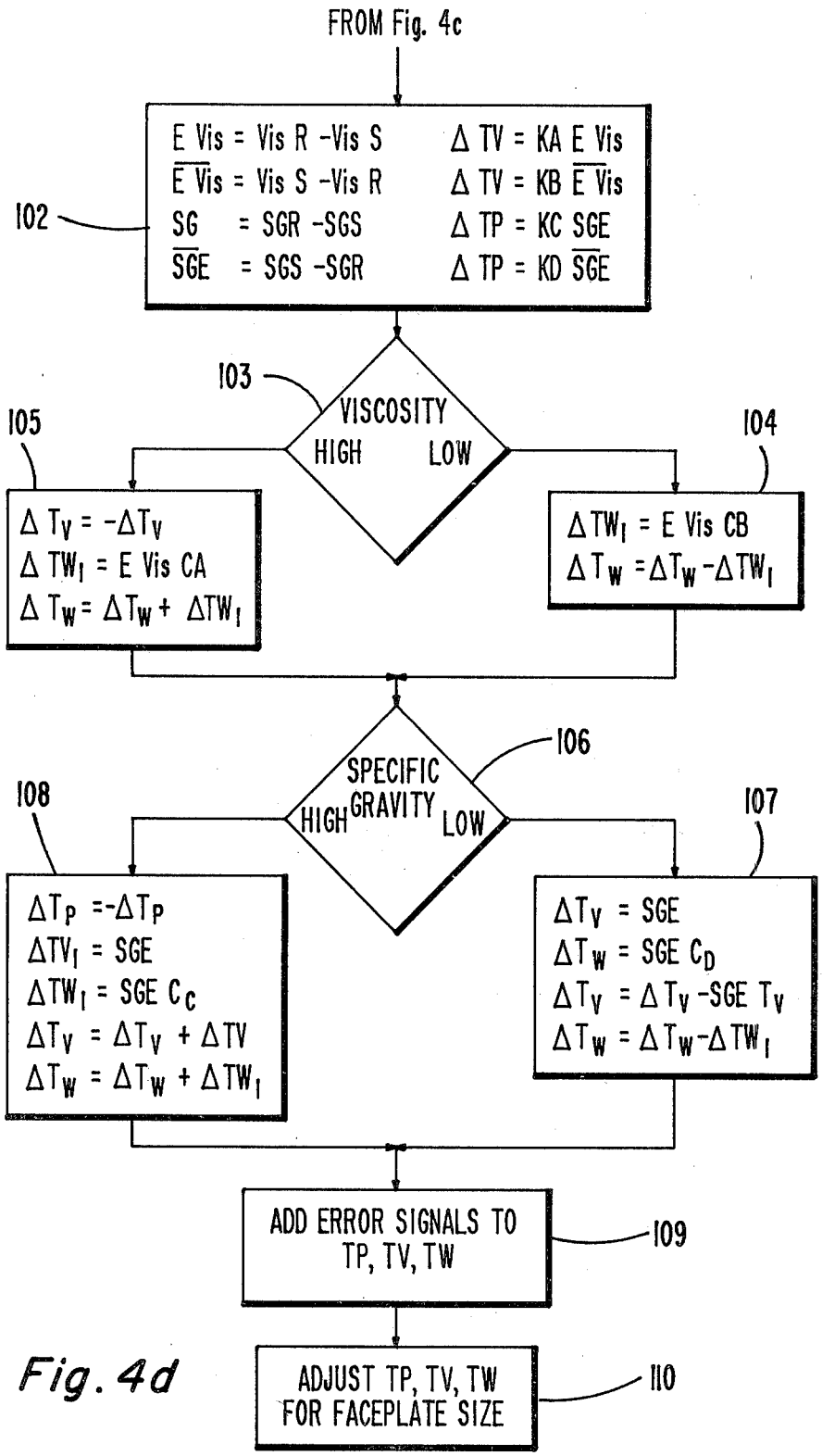

After the total opening times TP, TW and TV for the three valves 27, 28 and 29 are calculated, control function 57 is entered to determine whether or not a dispense signal has been entered. If a dispense signal has been entered, the dispense subroutine described fully hereinafter with respect to FIG. 3 is entered into. When a dispense signal has not been entered, control function 58 is entered to determine whether or not one of the sensed specific gravity or viscosity parameters is either above or below the permissible maximum or minimum value. When an out of limit parameters is sensed, control function 59 is entered and an out of limit light and an audible alarm are energized. When all sensed parameters have been tested, control function 60 is entered to determine whether or not a thumbwheel switch (TWS) entry has been made. When such an entry has been made, control function 61 is entered and the thumbwheel switch entry is entered to the processor. When such an entry has not been made, control function 62 is entered to determine whether or not the set point display switch is closed. When the switch is closed, the set point data is entered into the processor at control function 63. When the switch is not closed, the data from sensors 17, 18 and 31 are entered into the processor. The data is then displayed at control function 65 and the system returned to start point 44 at control function 66.

FIG. 3 is a flow chart of the routine for dispensing phosphor, water and PVA from the containers 24, 25 and 26 respectively, to the slurry within the container 11. At control function 67, the valves 27, 28 and 29 are opened and at control function 68, the specific gravity error signal is stored. Similarly, at control function 69, the viscosity error signal is stored. At control function 70, the signal is generated to indicate visually on the control panel of the processor that the valves are open. At control function 71, when one of the open times for any of the valves 27, 28 and 29 has expired, subroutines 72 and 73 are entered to close the valve and reset the valve open flag indication on the panel. Control function 74 returns the routine to start when all three of the valves 27, 28 and 29 are closed.

FIGS. 4a to 4d are a flow chart of the computation of the specific gravity and viscosity error signals and also the changes ΔTV, ΔTP and ΔTW which are added to the preset dispense times to determine the total dispense times TP, TW and TV.

The quantity of each of the materials phosphor, water and PVA from three containers 24, 25 and 26 respectively, (FIG. 1) to the container 11 is determined by the specific gravity and viscosity of the added materials and of the slurry in the container 11. As shown at control function 76 of FIG. 4a, the specific gravity volume relationship is:

$$S.G. = \frac{V_P SG_P + (V_V + V_W) SG_{VW}}{V_P + V_V + V_W} \quad (1)$$

Where:
SG = specific gravity of slurry in container 11
$SG_P$ = specific gravity of phosphor
$SG_{VW}$ = specific gravity of water and PVA
$V_P$ = volume of phosphor from container 24
$V_V$ = volume of PVA from container 26
$V_W$ = volume of water from container 25

The value of denominator is set to 100 milliliters because this is the known quantity of slurry dispensed from the container 11 for a 19V faceplate. When other sizes of faceplates are being coated, the denominator is adjusted in accordance with the ratio of the areas of the 19V and other size faceplate. The value of SG is known because it is the desired specific gravity of the slurry in the container 11. The specific gravity value $SG_{VW}$ of the PVA and water is 1.000 because the specific gravity of water is 1.000 and that of PVA is sufficiently close to 1.000 that the difference has no affect on the system.

Therefore, solving equation (1) for $V_P$ yields:

$$V_V + V_W = 100 - V_P.$$

The viscosity Vis of the slurry in container also must be held within accurate limits. Control function 77 of FIG. 4a therefore is:

$$\ln Vis = \frac{V_P \ln Vis_P + V_V \ln Vis_V + V_W \ln Vis_W}{V_P + V_V + V_W}$$

Where:
$V_P$, $V_V$ and $V_W$ = the volumes of phosphor, PVA and water in the containers 24, 26 and 25 respectively.
$Vis_P$, $Vis_V$ and $Vis_W$ = the viscosities of the phosphor, PVA, and water in the containers 24, 26 and 25 respectively.

The viscosity of water is 1.0 and the log of 1 is zero and therefore the last term drops off leaving control function 78 as follows:

$$\ln Vis = \frac{V_P \ln Vis_P + V_V \ln Vis_V}{V_P + V_V + V_W} \quad (2)$$

The flow rates of the valves 27, 28 and 29 are determined by the valve construction and are known. Therefore, to dispense the selected 100 ml of total material the open time T for each valve, as shown at control function 80 is:

$$T_P = V_P/R_P \quad (3)$$

$$T_V = V_V/R_V \quad (4)$$

$$T_W = V_W/R_W \quad (5)$$

where $R_P$, $R_V$ and $R_W$ are the flow rates of the phosphor, PVA and water respectively. To dispense different volumes of material for different sizes of faceplate the time T are multiplied by the volume ratio. For example, to dispense 180 ml of material, multiply all those times $T_P$, $T_V$ and $T_W$ by 180/1.00 = 1.8.

Any correction required for specific gravity also is based on a total 100 ml volume and 0.001 error. Phosphor is thus added to correct the specific gravity as shown at control function 81 as:

$$dSG/dV_1 = V_o(SG_1 - SG_2) \quad (6)$$

where:
$V_o$ is the volume added to
$V_1$ is the added volume
Accordingly, as shown at control function 82

$$V_o + V_1 = 1 \quad (6a)$$

Solving equation (6) for dV, as shown at control function 83, yields:

$$\frac{dV_1}{V_1} = \frac{V_o(SG_1 - SG_o)}{V_1 \, dSG} = \frac{(1 - V_1)}{(V_1)} \frac{(SG_1 - SG_o)}{dt} \quad (7)$$

therefore, as shown at control function 84:

$\Delta V_p = (dV_1/V_1) \times V_P$ = incremental volume of phosphor required to correct the specific gravity SG. $\quad (8)$ The specific gravity error SGE signal is defined as:

$$SGE = SGR - SGS$$

where:
SGR = the specific gravity reading from the sensor 17
SGS = the preselected specific gravity value
As shown at control function 85, the incremental change ΔTP in the open time of the value 27 is:

$$\Delta TP = (dV_1/V_1)T_P \quad (9)$$

and as shown at control function 86:
$$\Delta TP = K_c SGE \quad (10)$$

Thus, the incremental change in the open time of the phosphor valve 27 is a constant $K_c$ time the specific gravity error signal SGE.

The volume of phosphor added to correct the specific gravity must be compensated for by reducing the volume of water and PVA added. The water and PVA must be in the correct proportion to avoid changing the viscosity. Accordingly, the viscosity of the phosphor is proportional to the water and PVA.

Therefore, as shown at control function 87:

$$\Delta V_V + \Delta V_W = \Delta V_P \quad (11)$$

And, as shown at control function 88, the viscosity Vis relationship is:

$$Vis_T = [Vis^{\Delta VW} Vis(\Delta VP - \Delta VW)]^{\frac{1}{\Delta VP}} \quad (12)$$

Solving equation (12), at control function 89, using the known values of viscosity for the three materials and the ΔVP determined in equation (9) yields:

$$\Delta V_V = \Delta V_P - \Delta V_W \quad (13)$$

The required incremental changes $\Delta V_W$ of the water volume required a change in the open times ΔTW of the valve 28. Thus, as shown at control function 90:

$$\Delta TW = \Delta V_W C_T / R_w \quad (14)$$

Where: $C_T$ is a constant which corrects the flow rate $R_W$ to the 0.01 second unit of time interval used by processor 32.

At control function 91 the specific gravity error signal SGE is defined as:

$$SGE = SGR - SGS \quad (14a)$$

The change in open time ΔTW, for the valve 28 is shown at control function 92 as:

$$\Delta TW_1 = (\Delta TW / \Delta VW) SGE \quad (15)$$

The required correction for viscosity is obtained from the same procedure as the above specific gravity procedure. Thus, as shown at control function 93:

$$dVis/dV_1 = Vis_0^{V_0} Vis_1^{V_1} \ln(Vis_1) \quad (16)$$

Where:
$V_1$ = incremental volume change caused by the additional liquid.
$Vis_o$ = viscosity added to
$Vis_1$ = the added viscosity At control function 94, the viscosity error signal $EV_{IS}$ is defined by the program statement:

$$EV_{IS} = VisR - VisS \quad (17)$$

Where:
VisR = the sensed viscosity signal from sensor 18
VisS = the preselected viscosity signal.

The smallest incremental viscosity change is set as 0.1 centipoise. Hence, at control function 95

$$\Delta V_V = 0.1/(Vis_{max} - Vis_{min}) \quad (18)$$

and at control function 96, the incremental time change to affect the volume change $\Delta V_V$ is defined as:

$$\Delta TV = (dV_1/V_1) TV = (dV_1/V_1) TV \quad (19)$$

At control function 97, the incremental time change ΔTV is defined as $$\Delta TV = EVis\, K_V \quad (20)$$

Where:
ΔTV is the change in time that PVA is added to container 11
EVis is the viscosity error signal
$K_V$ is a constant determined by the construction of the valve 29.

The volume of PVA added to correct for the viscosity must be compensated for by a corresponding change in the water and phosphor volume to assure a minimum affect on the specific gravity. The PVA and water both effectively have a specific of gravity of unity and accordingly the compensation can be made using only the water. Thus, at control function 98:

$$\Delta V_W = \Delta V_V \quad (21)$$

and therefore, at control function 99, the incremental time change is:

$$\Delta TW = \Delta V_W C_T / RW \quad (22)$$

and, at control function 100:

$$\Delta TW = \Delta V_V C_T / RW \quad (22a)$$

Where: $C_T$ is the conversion constant which corrects the flow rate $R_W$, in milliliters/minute, to the 0.01 second unit of time interval used in the processor 32.

By substituting equation (21) into equation (22) at function 101, the additional valve opening time ΔTW is:

$$\Delta TW_1 = \Delta TW\, EVis / \Delta V_V \quad (23)$$

The viscosity and specific gravity errors can be caused by either a high or low difference. Thus, as shown at control function 102, a full set of error signals is available in the following program statements:

$EVis = Vis\, R - Vis\, S$ viscosity high $EVis = VisS - Vis\, R$ viscosity low $SGE = SGR - SGS$ specific gravity high $SGE = SGS - SGR$ specific gravity low $\Delta TV = K_A\, EVis$ $\Delta TV = K_B\, EVIS$ $\Delta TP = K_C\, SGE$ $\Delta TP = K_D\, SGE$ At decision function 103, when the viscosity is low, function 104 is entered and the incremental time change is:

$$\Delta TW_1 = EVis\, CB \quad (24)$$

$$\Delta TW = \Delta TW - \Delta TW_1 \quad (25)$$

When the decision from 103 is high viscosity control function 105 is entered and the incremental time changes are:

$$\Delta TV = -\Delta TV \quad (26)$$

$$\Delta TW_1 = EVis\, CA \quad (27)$$

$$\Delta TW = \Delta TW + \Delta TW_1 \quad (28)$$

Decision function 106 is then entered and when the specific gravity is low control function 107 is entered and the incremental time changes are:

$$\Delta TV_1 = SGE \quad (29)$$

$$\Delta TW_1 = SGE\ C_D \quad (30)$$

$$\Delta TV = \Delta TV - \Delta TV_1 \quad (31)$$

$$\Delta TW = \Delta TW - \Delta TW_1 \quad (32)$$

When the decision from 106 is high, specific gravity control function 108 is entered and the incremental time changes are:

$$\Delta TP = -\Delta TP \quad (33)$$

$$\Delta TV_1 = SGE \quad (34)$$

$$\Delta TW_1 = SGE\ C_c \quad (35)$$

$$\Delta TV = \Delta TV + \Delta TV_1 \quad (36)$$

$$\Delta TW = \Delta TW + \Delta TW_1 \quad (37)$$

After the specific gravity and viscosity incremental time changes are calculated control function 109 is entered and the incremental changes are added to the preset valve open times TP, TV and TW. At control function 110, the volume of slurry to be dispensed is adjusted in accordance with the size of the faceplate. When said adjustment is not required, control function 109 is the same as control function 56 of FIG. 2.

The continuous adjustment of the slurry viscosity and specific gravity after each dispense accurately maintains the parameters at preselected values within close tolerances and thus assures consistant product quality.

What is claimed is:

1. A system for controlling the viscosity and specific gravity of a slurry applied to the faceplate of a television picture tube comprising:
    first container means for storing said slurry and for dispensing said slurry to said faceplate, and for receiving excess slurry from said faceplate;
    second container means for dispensing a first material to said first container means;
    third container means for dispensing a second material to said first container means;
    fourth container means for dispensing a third material to said first container means;
    level sensor means for sensing the level of slurry in said first container means and providing a slurry level signal;
    specific gravity sensor means for sensing the specific gravity of the slurry of said first container and providing a sensed specific gravity signal;
    viscosity sensor means for sensing the viscosity of the slurry of said first container and providing a sensed viscosity signal;
    first and second means for respectively supplying a predetermined specific gravity signal and a predetermined viscosity signal; and
    data process control means for receiving said slurry level signal, said sensed specific gravity signal, said sensed viscosity signal, said predetermined specific gravity signal and said predetermined viscosity signal to produce a sensed specific gravity error signal and a sensed viscosity error signal in accordance with the difference between said sensed signals and said predetermined signals, said data process control means also comparing said sensed specific gravity error signal with a previous specific gravity error signal and also comparing said sensed viscosity error signal with a predetermined viscosity error signal to correct the level, specific gravity and viscosity of said slurry in said first container to preselected values.

2. The system of claim 1 wherein said data process control means corrects said specific gravity and said viscosity in accordance with the difference between said previous error signal when said sensed error signal is less than said previous error signal and in accordance with a calculated error signal when said sensed error signal exceeds said previous error signal.

3. The system of claim 2 further including valve means arranged between said first container means and each of said second, third and fourth container means to control the flow of said first, second and third materials to said first container and wherein said data process control means controls said valves to adjust the flow rates and volumes of said materials to said first container.

4. The system of claim 3 wherein said data process control controls the time said valves are open to control the total volume of material added to said first container.

5. The system of claim 4 wherein said data process control controls the flow rate and opening time of said valves in accordance with said error signals to thereby control the volume of each of said materials added to said first container.

6. The system of claim 5 wherein said data process control controls the dispensation of said slurry to said faceplate in accordance with the size of said faceplate.

7. The system of claim 1 or 5 wherein said first material has a specific gravity greater than the specific gravity of said slurry and said second material has a viscosity greater than the viscosity of said slurry.

8. The system of claim 7 wherein said first material is a phosphor, said second material is polyvinyl alcohol and said third material is water.

9. The system of claim 8 wherein the volume of phosphor added to said slurry is selected to correct the specific gravity of said slurry to said preselected value, the volume of polyvinyl alcohol added to said slurry is selected to correct the viscosity of said slurry to said preselected value, and the volume of water added to said slurry is selected so that the total volume of phosphor, polyvinyl alcohol and water corrects the level of slurry in said first container to said preselected level.

10. A method of continuously controlling the specific gravity and viscosity of a slurry to which additional slurry having unknown specific gravity and viscosity is frequently added comprising the steps of:
    dispensing said slurry from a first container onto an object to be coated with slurry and returning excess slurry from said object to said first container;
    monitoring the level of slurry in said first container after said excess slurry is returned to said container to determine the change of level from a predetermined level;
    sensing the specific gravity and viscosity of the slurry dispensed to said object;
    comparing the sensed specific gravity and viscosity to predetermined values;
    generating error signals representative of the differences between said sensed values and said predetermined values;
    providing calculated error signals, and comparing said generated error signals with a previous error signal and using the difference between said generated and said previous error signals when said generated error signal exceeds said previous error signal, and using the difference between said generated error signal and a calculated error signal when said previous error signal exceeds said generated error signal;

providing a supply of a first material having a specific gravity greater than the predetermined specific gravity of said slurry, providing a supply of a second material having a viscosity greater than the predetermined viscosity of said slurry, and providing a supply of a third material; and utilizing said error signals to add said first, second and third materials to said first container in amounts necessary to bring the specific gravity, viscosity and level of said slurry to values approximately equal to said predetermined values.

11. The method of claim 10 further including the step of controlling the flow rate at which said first, second and third materials are added to said slurry.

12. The method of claim 10 further including the steps of adding a volume of said first material necessary to raise the specific gravity of said slurry to said predetermined value, adding a volume of said second material necessary to raise the viscosity of said slurry to said predetermined value, and adding a volume of said third material necessary to bring the total volume of said three materials to the volume necessary to raise the level of said slurry in said first container to said predetermined value.

* * * * *